United States Patent [19]
O'Neill

[11] Patent Number: 6,102,348
[45] Date of Patent: Aug. 15, 2000

[54] APPLIANCE MOUNTING DEVICE

[75] Inventor: Edward L. O'Neill, Oakland, Calif.

[73] Assignee: Lucasey Manufacturing Company, Oakland, Calif.

[21] Appl. No.: 09/294,922

[22] Filed: Apr. 19, 1999

[51] Int. Cl.[7] .................................................. A47F 5/00
[52] U.S. Cl. .............................. 248/289.11; 248/292.13
[58] Field of Search .................... 248/289.11, 291.11, 248/278.1, 276.1, 282.1, 284.1, 292.13

[56] References Cited

U.S. PATENT DOCUMENTS

| | | | |
|---|---|---|---|
| 4,453,695 | 6/1984 | Sennott et al. | 248/278.1 X |
| 4,470,106 | 9/1984 | Norton | 248/278.1 X |
| 5,924,665 | 7/1999 | Sweere et al. | 248/278.1 X |

*Primary Examiner*—Ramon O. Ramirez
*Attorney, Agent, or Firm*—Niro, Scavone, Haller & Niro

[57] ABSTRACT

A mounting device for securing an appliance such as a flat screen television to a support including a base that is mounted to the support and a frame that is adapted to releasably secure the appliance. The base and frame are connected together by arms which are rotatably connected to the frame and base by hinges which permit the appliance to be positioned in a number of horizontal positions with respect to the support. Vertical positioning of the appliance with respect to the support is accomplished by further including pivoting connectors on the frame to which the arms are attached.

5 Claims, 4 Drawing Sheets

APPLIANCE MOUNTING DEVICE

BACKGROUND OF THE INVENTION

The present invention relates to a device for mounting an appliance such as a flat screen television or monitor to a support surface such as a wall. More specifically, the device is adapted to allow positioning of the appliance in different orientations to optimize use of the appliance.

SUMMARY OF THE INVENTION

When an appliance such as a flat screen TV is mounted on a support surface such as a wall, or some other structure, several design considerations must be met. First, to take advantage of the flat screen design, it is desirable to mount the appliance in close proximity to the mounting surface. Moreover, the mounting device should also have a slim profile, with as much of the device hidden from view as possible for enhanced aesthetic appearance. In addition, when the appliance is mounted, positional, adjustment is also desirable. For example, in a flat screen TV application, the monitor often needs to be oriented toward the viewing audience. Also, in some instances, it is desirable to angle or tilt the screen to eliminate glare that may otherwise result from an external light source.

The present invention provides a novel solution to the above-mentioned design considerations by providing a mounting device that includes a base which includes outwardly extending arms adapted to engage a frame to which the appliance is attached. The arms are pivotally connected to the base and frame to adjust the spacing of the appliance from the support surface and its angular position as well. The arms are constructed with articulating sections, and each is joined to the frame via a vertically pivotable connector. The connector, in turn, is biased to counteract gravitational forces that might otherwise cause undesired movement of the appliance.

Thus, it is an object of invention to provide an appliance mounting device with a slim profile.

A further object of the present invention is to provide a mounting device which is unobtrusive, being generally hidden from view.

Still another object of the present invention is to provide a device which mounts the appliance in close proximity to the support surface while allowing the appliance to be easily adjusted in a plurality of positions.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with th accompanying drawings in which:

DESCRIPTION OF A PREFERRED EMBODIMENT

Figure 1:
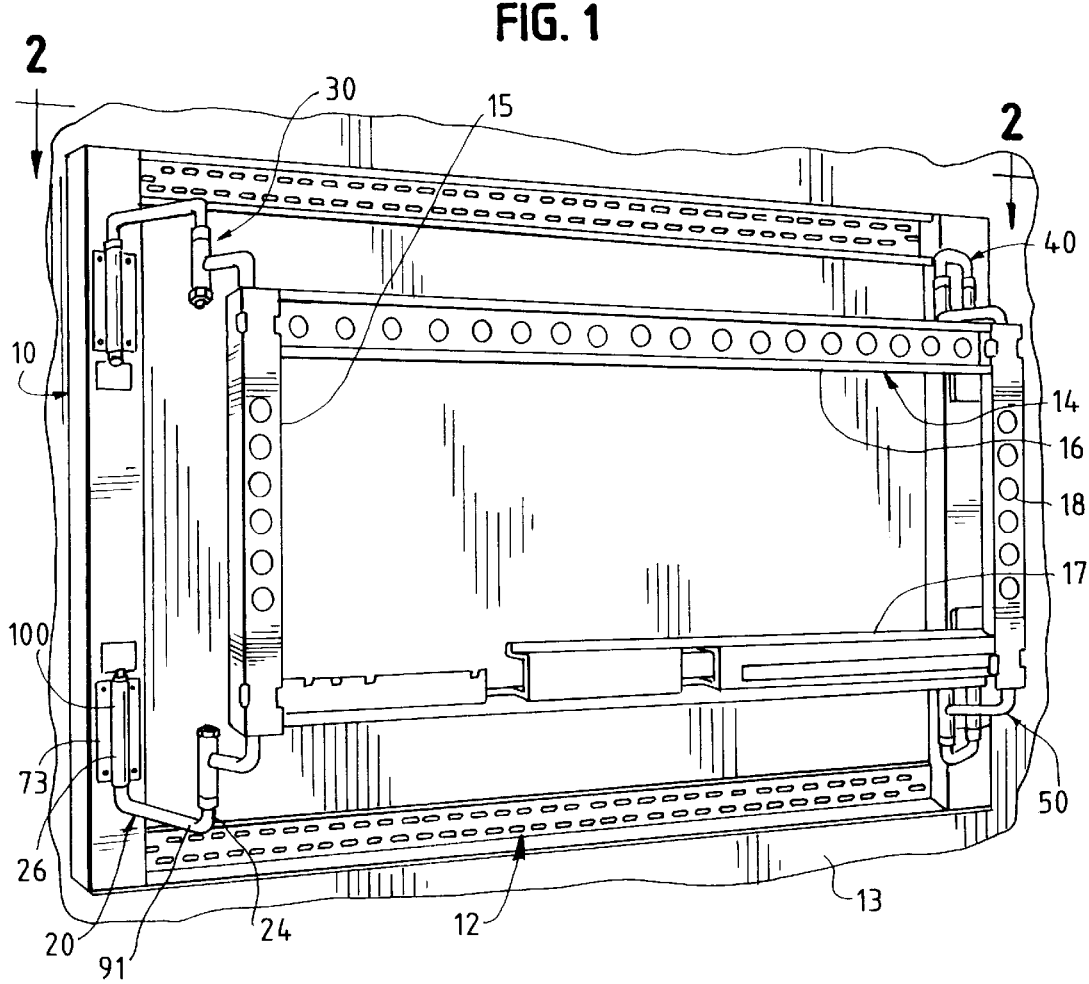
FIG. 1 is perspective view of one embodiment of the present invention.
Figure 2:
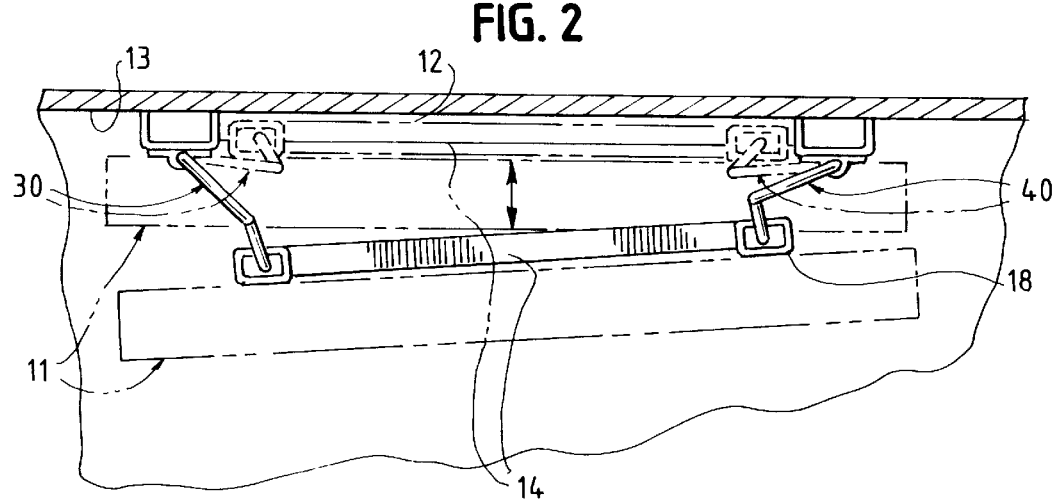
FIG. 2 is a top view of the embodiment shown in FIG. 2 with portions removed to reveal various aspects of the invention.
Figure 3:
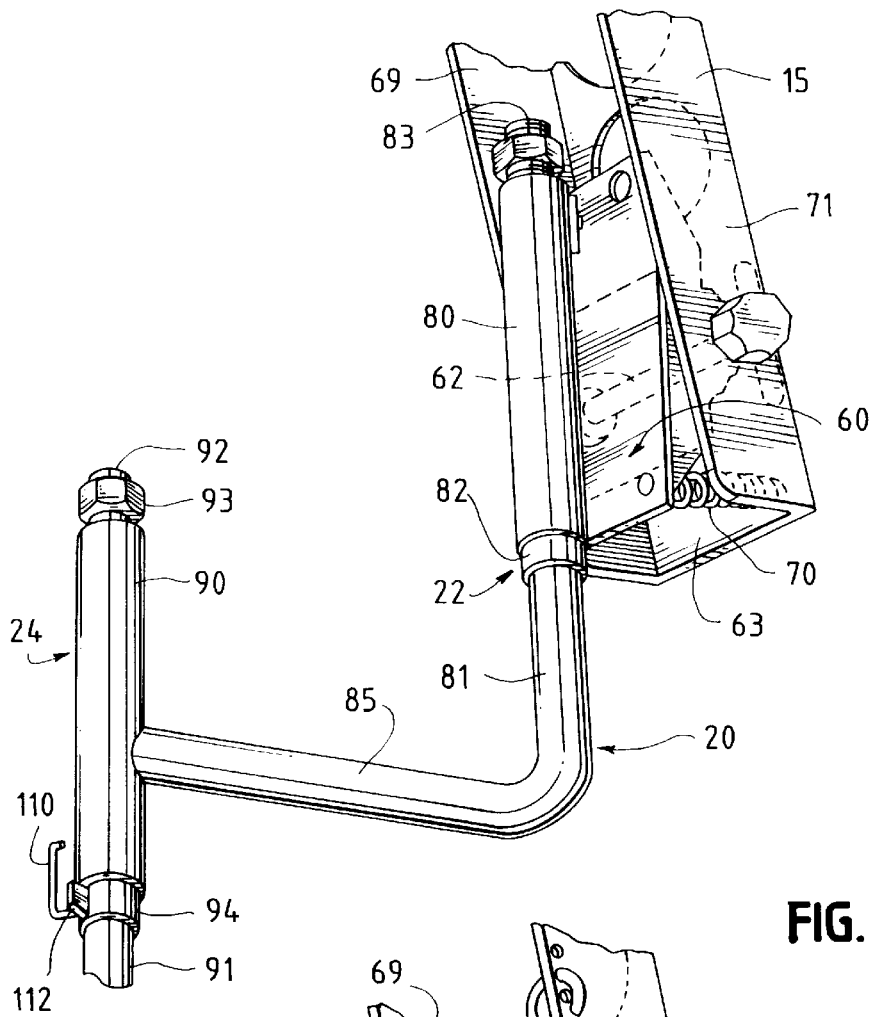
FIG. 3 is a perspective view showing how a support arm may be pivotally connected to the frame.

As shown in FIGS. 1 and 2, mounting device 10 is designed to secure an appliance 11 such as a flat screen TV to a support or mounting surface 13 such as a wall. Mounting device 10 includes a base 12 and a frame or housing 14 to which the appliance 11 may be secured. The base 12 is itself mounted to surface 13 by any means well known in the art. Frame 14 may be rectangular in shape having a plurality of segments 15, 16, 17 and 18 which may be made from U-shaped channels as shown in FIGS. 1–3. While a preferred embodiment of frame 14 is shown as a rectangular structure, it may be comprised of different shapes and of a plurality of individual channels or components as well. For example, frame 14 may include segments 15 and 18 and not segments 16 and 17. In the illustrated embodiment, support arms 20, 30, 40 and 50 connect base 12 and frame 14.

Figure 4:
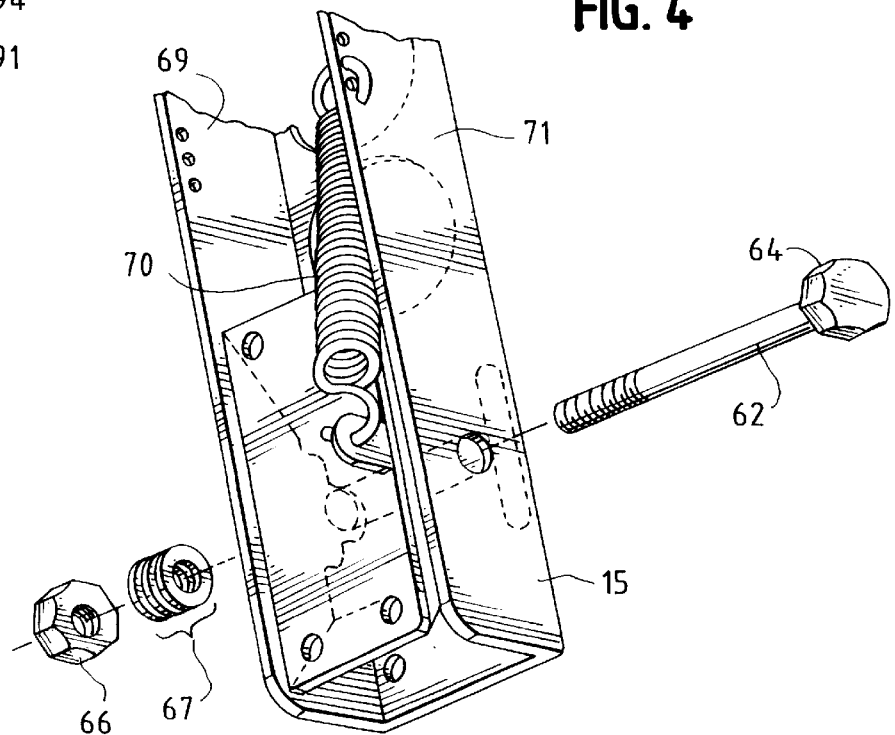
FIG. 4 is an exploded perspective view of an alternate embodiment of a pivotal connector.

As shown in FIG. 3, arm 20 is connected to frame 14 by means of a pivotal connector 60 disposed within interior 63 of U-shaped frame segment 15. As further shown, connector 60 pivots about an axis created by shaft 62. As shown in FIG. 4, shaft 62 may be part of a fastener 64 which secures connector 60 within interior space 63 through the use of coacting fastener 66. Of course, those of ordinary skill in the art will appreciate that connector 60 may be pivotally connected to frame 14 in a number of ways including, without limitation, pins, rivets, and the like.

Figure 5:
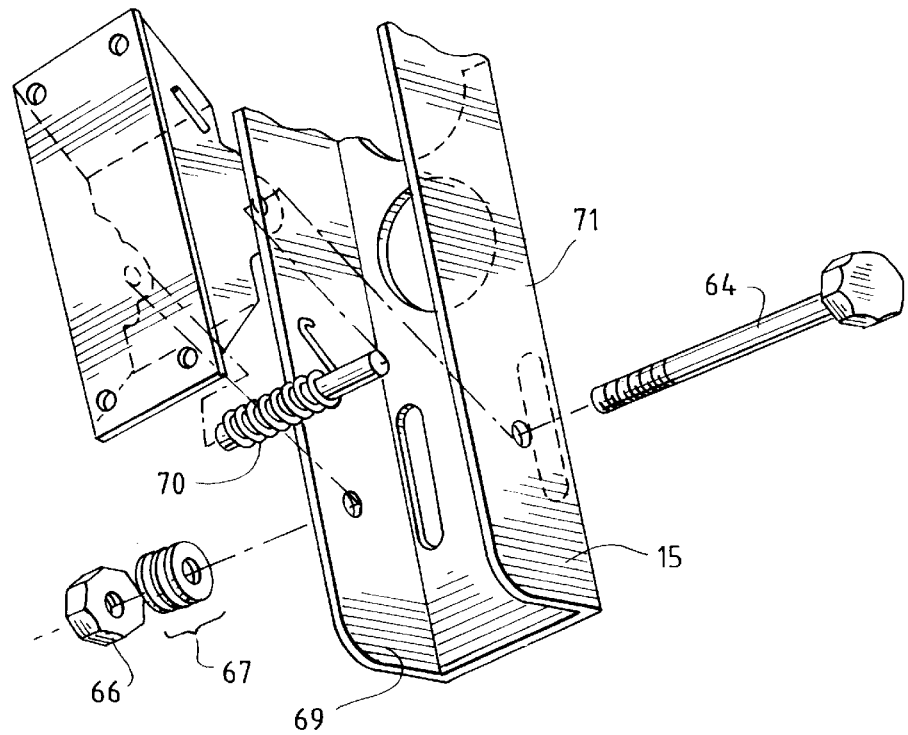
FIG. 5. is an exploded perspective view of yet another embodiment of a pivotal connector.
Figure 6:
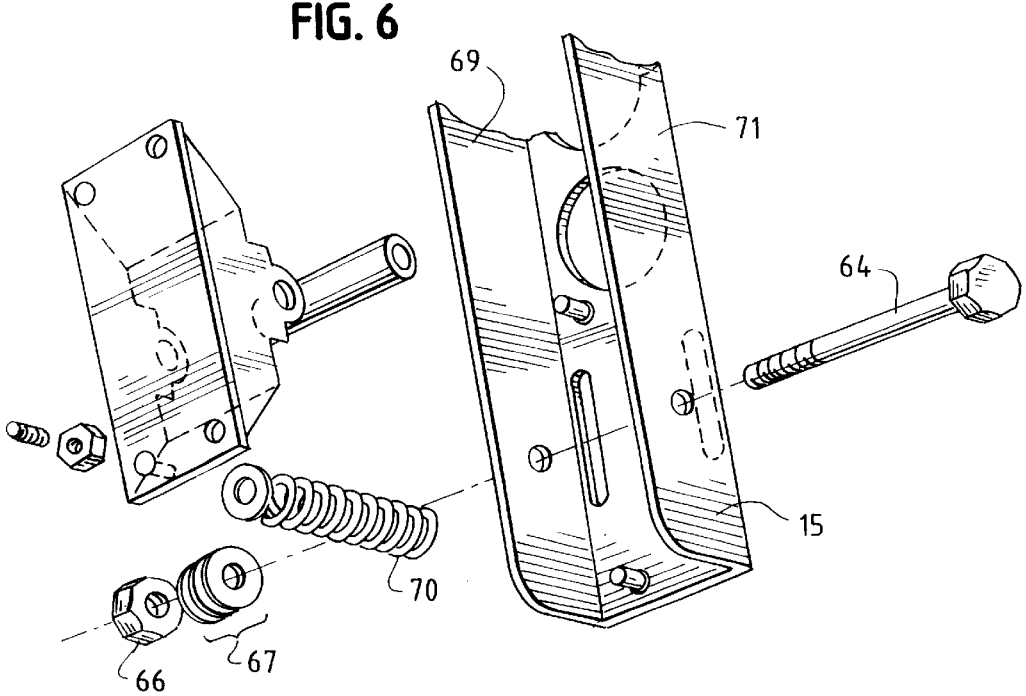
FIG. 6 is an exploded perspective view of still another embodiment of a pivotal connector.

As also shown in FIGS. 4–6, the present invention may employ a variety of different connectors having biasing means, such as spring 70, to urge connector 60 upwardly. This biasing force is desirable to offset the gravitational force acting on the mounting device and appliance when assembled, which will tend to pull the appliance down and potentially out of a desired orientation. As shown in FIGS. 4–6, spring 70 may be conveniently located within the frame segment and is affixed to the connector 60 in a manner to bias the connector upwardly.

Fasteners 64 and 66 may also be used in combination with a lock or spring washer 67 to hold the appliance in a desired position. As the fasteners are tightened, a clamping action is developed which urges walls 69 and 71 toward connector 60. This operates to resist movement of the connector, thus maintaining the position of the appliance as well.

As shown in FIGS. 1, and 3, arm 20 is rotatably affixed to base 12 by bracket 73 and includes three articulating connections 22, 24, and 26. Articulating connection 22 is located in close proximity to the point where arm 20 connects to connector 60. Articulating connection 26 is located in close proximity to the point where arm 20 is connected to base 12 and articulating connection 24 is located in a position between connections 22 and 26. Moreover, as shown in FIG. 3, stops 110 and 112 are also used. The stops prevent the arms from swinging past a predetermined angular position during the operation of the device and this keeps the arms working in unison. Arm 20 may be secured to connector 60 by fasteners, weldments or other known means. Typically, the construction and operation of arms 30, 40 and 50 and their associated connectors will be the same as illustrated for arm 20 and connector 60.

The articulating connections are created by using a series of rods which are fitted within tubular casings. As shown, a first tubular casing 80 having a bore sized to receive a rod 81 is provided and is affixed to connector 60. In turn, rod 81 is secured within casing 80 by collar stop 82 and threaded end 83 with coacting fastener 84. Rod 81 and casing 80 are adapted and sized to form a hinge that permits rod 81 to smoothly rotate within casing 80 and, for ease of movement, bearings (not shown) may be used as well. Rod 81, as shown in FIG. 3, is also angled and includes an extended portion 85 joined to casing 90 which is adapted to receive a second rod 91 having a threaded end 92. As with casing 80 and rod 81, casing 90 and rod 91 are assembled in the same manner through the use of threaded end 92, fastener 93 and collar 94 to form a hinge or articulating connection 24. In addition, as shown in FIG. 1, rod 91 is rotatably assembled to casing 100 which is affixed to the base 12 by bracket 73 to form yet another hinge or articulating connection 26 in the manner described above. Moreover, stops 110 and 112 may be used as well in connection with each articulating connection created.

Figure 7:
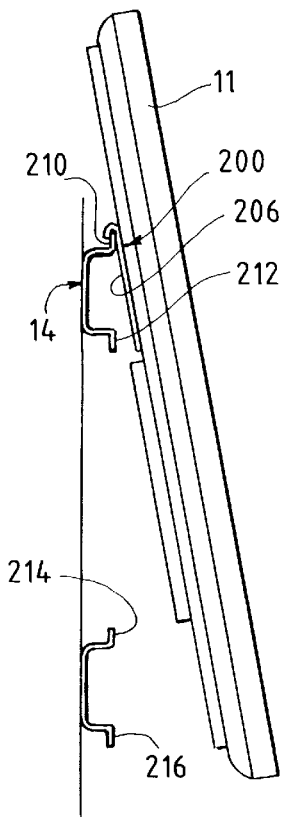
FIG. 7 is a sideview showing how the frame of the device may be configured in order to releasably mount the appliance to the frame.
Figure 8:
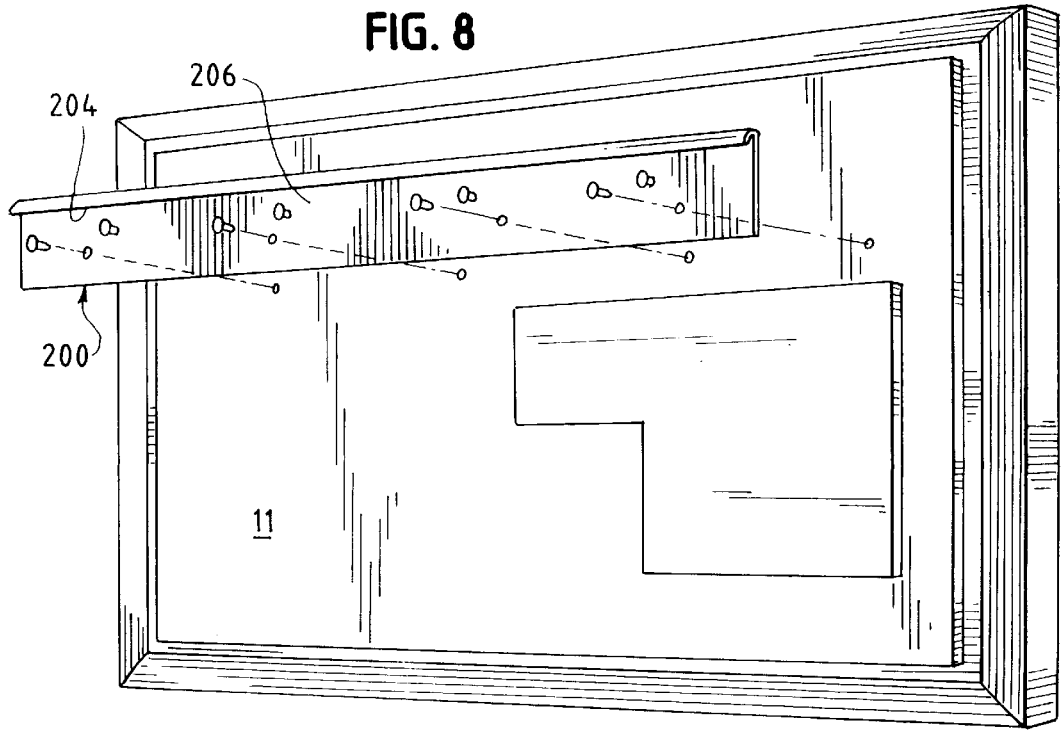
FIG. 8 is a perspective view of the back of an exemplary appliance adapted for assembly to a mounting device of the present invention.

In use, an appliance 11 is attached to frame 14 after base 12 is secured to a support surface. Since it is desirable to releasably mount appliance 11 to frame 14, a mounting plate 200 may be used as is shown in FIGS. 7 and 8. Plate 200 includes a planar portion 206 and lip 202 which forms channel 204. After plate 200 is attached to appliance 11 by means of screws or other conventional fasteners, lip 202 is placed over flange 210 on frame 14 so that flange 210 nests within channel 204. In addition, frame 14 includes abutments 212,214, and 216 for additional support, contacting other portions of the appliance located below channel 204.

Assembly of the frame 14 and appliance 11 in the manner described above creates at least two contact points which extend along a substantial portion of the appliance's width. This, in turn, assists in maintaining the contact between the appliance 11 and frame 14 during the operation of the device to thereby reduce potentially damaging bending of the appliance. Moreover, it also permits the appliance to be easily and quickly removed from the frame when desired.

Once the components are connected, the articulating connections or hinges allow a user to adjust the position of the appliance by simply moving the device into a desired location. Moreover, as shown in FIG. 1, having the arms extend from the support surface outwardly to a position that is well within the outer periphery of the appliance allows the device 10 to be hidden from view and also provides the unit with a slim-profile.

The distance appliance 11 is located from the support surface may also be adjusted. This is accomplished by the articulating or hinged connections on each of the arms. This arrangement allows the segments of each of the arms to fold inwardly in a horizontal direction as the appliance is positioned toward the wall. This folding action of the arms also enables the appliance to maintain its centrally located position with respect to base 12 even when the distance the appliance is located from the support is adjusted. In other words, the ability of the arms to fold in on themselves allows the lateral position of the appliance with respect to the support to remain generally constant even when the appliance's distance with respect to the base is being adjusted. Of course, due to their independent movement, the arms on one side of the device may be extended further than on the other, allowing the appliance 11 to be angled horizontally relative to the wall.

Figure 9:
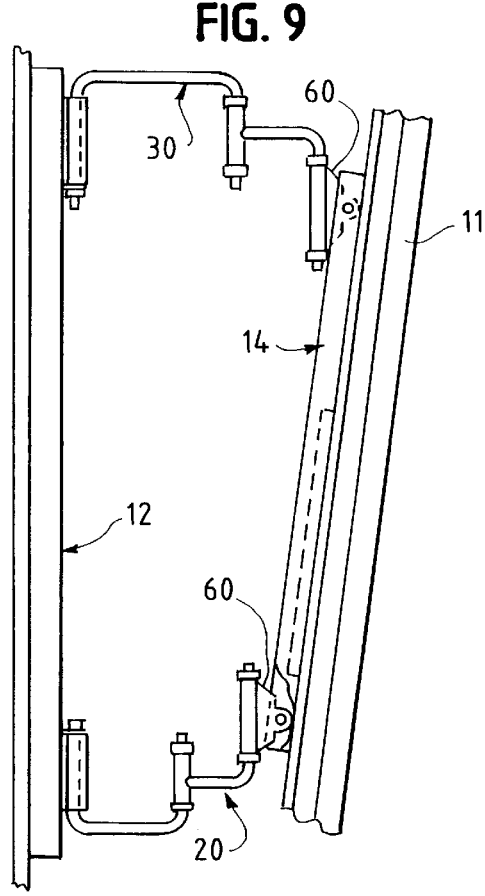
FIG. 9 is a side view showing how the connectors permit the tilt adjustment of the appliance.

The tilt or vertical position of the appliance may also be adjusted by the device. This is accomplished through the interaction of the arms with the pivotal connectors 60. For example, as configured and as shown in FIG. 9, the vertical rotation provided by the connectors allows the top of the appliance to be tilted outwardly away from the support surface while the bottom is moved inwardly. Likewise, the opposite adjustment may be made as well. Furthermore, as a result of the articulating connections or hinges, the right or left upper corner of the appliance may be spaced further from the support surface. And again, the opposite operation may be performed. This allows for additional angular positioning of the appliance.

Lastly, while springs 70 may be used in combination with the connectors 60 to counteract gravitational forces, in instances where springs 70 cannot do so alone, coacting fasteners 64 and 66 may be implemented to create an additional force that assists in balancing the effect gravity has on the device by resisting the movement of the connectors within the housing.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. An apparatus for mounting a generally planar display monitor comprising:

a base adapted for mounting to a support surface;

a mounting frame engagably supporting the monitor;

at least one pair of articulated arms extending between said base and said frame, said arms joined to said base and frame by first and second hinges;

each of the arms being connected to the base and the frame to permit horizontal rotation of the arms relative to said hinges; and each of said arms also being connected to the frame by spring biased and vertically pivotable connectors.

2. The device of claim 1 wherein each of said arms further includes a third hinged connection located between said frame and said base.

3. The device of claim 1 wherein said base includes four corners and each of the corners includes an arm extending from the base to the frame.

4. A device for mounting a generally planar appliance to a support surface comprising:

a base adapted to be mounted to the support surface and a frame adapted to receive said appliance;

a plurality of arms having opposing ends, said arms extending from the base to the frame;

a plurality of pivotal connectors attached to said frame and rotatable in a vertical direction, said connectors being associated with said arms to permit adjustment of the appliance relative to a vertical plane;

a spring associated with each of the connectors, said spring biasing the frame and appliance to counteract gravitational forces; and one end of each of said arms being rotatably connected to the base and the opposing end of each of said arms being rotatably connected to the frame whereby said appliance is positionable in a plurality of orientations relative to the support surface.

5. A device for mounting a generally planar appliance to a support surface comprising:
   a base adapted to be mounted to the support surface and a frame adapted to receive said appliance;
   a plurality of arms having opposing ends, said arms extending from the base to the frame;
   a plurality of pivotal connectors located in an interior space defined by said frame and rotatable in a vertical direction, said connectors being associated with said arms to permit adjustment of the appliance relative to a vertical plane; and
   one end of each of said arms being rotatably connected to the base whereby said appliance is positionable in a plurality of orientations relative to the support surface.

* * * * *